(12) United States Patent
Kivi et al.

(10) Patent No.: US 9,550,656 B2
(45) Date of Patent: Jan. 24, 2017

(54) STABILIZING OF FOREST WORK UNIT

(71) Applicant: PONSSE OYJ, Vieremä (FI)

(72) Inventors: Aleksi Kivi, Kuopio (FI); Mikko Oinonen, Iisalmi (FI)

(73) Assignee: PONSSE OYJ, Vieremä (FI)

( * ) Notice: Subject to any disclaimer, the term of this patent is extended or adjusted under 35 U.S.C. 154(b) by 0 days.

(21) Appl. No.: 14/404,359

(22) PCT Filed: May 31, 2013

(86) PCT No.: PCT/FI2013/050592
§ 371 (c)(1),
(2) Date: Nov. 26, 2014

(87) PCT Pub. No.: WO2013/178886
PCT Pub. Date: Dec. 5, 2013

(65) Prior Publication Data
US 2015/0151952 A1    Jun. 4, 2015

(30) Foreign Application Priority Data

May 31, 2012  (FI) ...................................... 20125598

(51) Int. Cl.
*G06F 7/70* (2006.01)
*G06F 19/00* (2011.01)
(Continued)

(52) U.S. Cl.
CPC ............. *B66C 13/18* (2013.01); *B60P 1/045* (2013.01); *B60P 3/41* (2013.01); *B60W 30/04* (2013.01);
(Continued)

(58) Field of Classification Search
CPC ...... B60R 2022/485; B60R 1/04; B60R 1/072; B60R 1/02; B60R 22/201; B60R 22/48; B60R 1/10; B60R 1/087; B66C 23/80; B66C 23/00; B66C 23/72; B66C 23/88; B60G 2400/1042; B60G 17/06; B60G 17/08; B60G 21/0551; B60G 3/26; B60G 7/001; B62D 27/02; B62D 21/02; B62D 21/12; B62D 21/14; B62D 21/157; B62D 25/08; B62D 25/10; B62D 5/18; B62D 65/02; B60W 2050/0036; B60W 2300/125; B60W 2420/42; B60W 2520/10
(Continued)

(56) References Cited

U.S. PATENT DOCUMENTS 3,565,273 A * 2/1971 Hahn .................. B66F 9/10
                                                       414/631
3,703,298 A * 11/1972 Laverda ............ A01D 75/285
                                                       280/124.112
(Continued)

FOREIGN PATENT DOCUMENTS

CN   131591912 A   10/2001
DE   29 10 057 A1   9/1980
(Continued)

OTHER PUBLICATIONS

Chinese Office Action dated Jul. 4, 2016 with English translation is attached.

*Primary Examiner* — Calvin Cheung
*Assistant Examiner* — Luis A Martinez Borrero
(74) *Attorney, Agent, or Firm* — Birch, Stewart, Kolasch & Birch, LLP

(57) ABSTRACT

A method for stabilizing at least one frame part of a forest work unit involves determining a moment applied by a payload of the forest work unit to a frame part to be supported and determining a magnitude and direction of at least one support moment needed at least for stabilizing the frame part on the basis of the moment applied by the payload (Continued)

to the frame part to be supported. An arrangement for stabilizing at least one frame part of a forest work unit comprises means for carrying out said determinations.

21 Claims, 4 Drawing Sheets

(51) Int. Cl.

| | | |
|---|---|---|
| G06G 7/00 | (2006.01) | |
| G06G 7/76 | (2006.01) | |
| B66C 13/18 | (2006.01) | |
| B60W 30/04 | (2006.01) | |
| B60W 40/13 | (2012.01) | |
| B62D 37/00 | (2006.01) | |
| B60P 1/04 | (2006.01) | |
| B60P 3/41 | (2006.01) | |
| B66C 13/16 | (2006.01) | |
| B62D 53/00 | (2006.01) | |
| B62D 53/02 | (2006.01) | |
| A01G 23/02 | (2006.01) | |
| G01M 1/12 | (2006.01) | |
| G01M 17/007 | (2006.01) | |

(52) U.S. Cl.
CPC .............. *B60W 40/13* (2013.01); *B62D 37/00* (2013.01); *B62D 53/005* (2013.01); *B62D 53/021* (2013.01); *B66C 13/16* (2013.01); *A01G 23/02* (2013.01); *B60W 2040/1307* (2013.01); *B60W 2520/22* (2013.01); *B60W 2530/10* (2013.01); *B60Y 2200/417* (2013.01); *B60Y 2200/44* (2013.01); *G01M 1/122* (2013.01); *G01M 17/007* (2013.01)

(58) Field of Classification Search
USPC .............. 701/49, 37, 301, 96, 1, 41, 50, 124, 22, 701/29.1, 32.3, 32.4, 33.7, 36; 280/124.165, 280/124.171, 124.152, 5.508, 124.139; 180/220, 405, 65.8, 65.51, 9.5, 215, 309, 180/440, 252
See application file for complete search history.

(56) References Cited

U.S. PATENT DOCUMENTS

| | | | | |
|---|---|---|---|---|
| 4,496,062 A * | 1/1985 | Gattu | ............ | B66C 23/78 212/302 |
| 5,097,419 A * | 3/1992 | Lizell | ............ | B60G 17/016 188/266.5 |
| 5,231,583 A * | 7/1993 | Lizell | ............ | B60G 17/015 280/5.506 |
| 5,258,913 A * | 11/1993 | Baldauf | ............ | B60G 17/017 254/423 |
| 5,742,228 A * | 4/1998 | Levy | ............ | B60P 1/28 180/282 |
| 6,027,173 A * | 2/2000 | Bettini | ............ | B60P 1/045 280/6.154 |
| 6,142,180 A * | 11/2000 | Woodling | ............ | B66C 23/42 137/615 |
| 6,206,124 B1 * | 3/2001 | Mallette | ............ | B62D 55/104 180/193 |
| 6,378,686 B1 * | 4/2002 | Mayer | ............ | B65G 21/14 198/311 |
| 6,477,455 B2 * | 11/2002 | Panizzolo | ............ | B60G 9/02 280/124.161 |
| 6,600,974 B1 | 7/2003 | Traechtler | | |
| 6,923,453 B2 * | 8/2005 | Pivac | ............ | B60G 17/005 280/280 |
| 7,017,701 B2 * | 3/2006 | Flynn | ............ | B60G 17/017 180/282 |
| 7,077,227 B2 * | 7/2006 | Oliver | ............ | F16F 15/0275 180/89.12 |
| 7,318,593 B2 * | 1/2008 | Sterly | ............ | B60G 21/0551 267/189 |
| 7,328,810 B1 * | 2/2008 | Rhodes | ............ | B66C 23/80 212/180 |
| 7,478,834 B2 * | 1/2009 | Schlecht | ............ | B66C 23/42 280/763.1 |
| 7,735,574 B2 * | 6/2010 | Smart | ............ | B62D 9/00 172/278 |
| 7,810,887 B2 * | 10/2010 | Hjerth | ............ | B60P 1/045 298/17 S |
| 8,025,340 B2 * | 9/2011 | Foisie | ............ | B60P 1/045 280/6.154 |
| 8,103,418 B2 * | 1/2012 | Osswald | ............ | B62D 21/14 187/224 |
| 8,275,516 B2 * | 9/2012 | Murphy | ............ | A01B 69/00 701/124 |
| 9,114,684 B2 * | 8/2015 | Maurer | ............ | B60G 17/017 |
| 2003/0015982 A1 * | 1/2003 | Cox-Smith | ............ | G05B 19/406 318/433 |
| 2004/0232632 A1 * | 11/2004 | Beck | ............ | B60G 17/016 280/5.5 |
| 2005/0092540 A1 * | 5/2005 | Saarinen | ............ | B60D 1/32 180/418 |
| 2005/0258614 A1 * | 11/2005 | Dove | ............ | B60G 3/20 280/124.141 |
| 2006/0104766 A1 * | 5/2006 | Ford | ............ | B66F 3/46 414/458 |
| 2007/0067085 A1 * | 3/2007 | Lu | ............ | B60T 8/172 701/70 |
| 2007/0182110 A1 * | 8/2007 | Urababa | ............ | B60G 17/0162 280/5.508 |
| 2007/0241527 A1 * | 10/2007 | Lie | ............ | B60G 7/008 280/124.153 |
| 2008/0093818 A1 * | 4/2008 | Nykanen | ............ | F16F 9/063 280/124.159 |
| 2008/0155866 A1 * | 7/2008 | Congdon | ............ | E02F 3/651 37/416 |
| 2008/0284118 A1 * | 11/2008 | Venton-Walters | ......... | B60G 3/14 280/6.154 |
| 2009/0056961 A1 * | 3/2009 | Gharsalli | ............ | E02F 3/844 172/4.5 |
| 2009/0196722 A1 | 8/2009 | Anderson | | |
| 2009/0224493 A1 * | 9/2009 | Buma | ............ | B60G 17/0162 280/5.511 |
| 2010/0045092 A1 | 2/2010 | Hjerth et al. | | |
| 2010/0117323 A1 * | 5/2010 | Lundmark | ......... | B60G 21/0555 280/124.106 |
| 2010/0230876 A1 * | 9/2010 | Inoue | ............ | B60G 11/27 267/140.14 |
| 2010/0288518 A1 * | 11/2010 | Reincke | ............ | A01B 45/023 172/21 |
| 2010/0301635 A1 * | 12/2010 | Andou | ............ | B62D 33/0617 296/190.05 |
| 2011/0089658 A1 * | 4/2011 | Buhl | ............ | B60G 17/0277 280/124.106 |
| 2011/0175323 A1 * | 7/2011 | Kimener | ............ | B62D 53/0864 280/476.1 |
| 2011/0213530 A1 * | 9/2011 | Hunt | ............ | A01B 45/023 701/50 |
| 2012/0025477 A1 * | 2/2012 | Mackin | ............ | B60B 35/1054 280/5.522 |
| 2012/0239259 A1 * | 9/2012 | McCabe | ............ | B60G 17/016 701/50 |
| 2014/0214283 A1 * | 7/2014 | Maurer | ............ | H02P 29/0044 701/49 |
| 2014/0379227 A1 * | 12/2014 | Reuter | ............ | E01C 23/088 701/50 |
| 2015/0097351 A1 * | 4/2015 | Rosepiler | ............ | B60G 21/0551 280/124.152 |

FOREIGN PATENT DOCUMENTS

| | | |
|---|---|---|
| EP | 1319535 A2 | 6/2003 |
| EP | 1 378 483 A | 1/2004 |

(56) References Cited

FOREIGN PATENT DOCUMENTS

| | | |
|---|---|---|
| EP | 1 261 515 B1 | 12/2005 |
| EP | 2 085 299 A2 | 8/2009 |
| EP | 2 298 689 A2 | 3/2011 |
| FI | 121705 B | 3/2011 |
| FI | 121780 B | 4/2011 |
| GB | 2046957 A | 11/1980 |
| WO | WO 03/055735 A | 7/2003 |
| WO | WO 2006/106296 A1 | 10/2006 |
| WO | WO 2011/064453 A1 | 6/2011 |
| WO | WO 2012/113981 A1 | 8/2012 |

* cited by examiner

STABILIZING OF FOREST WORK UNIT

BACKGROUND

The invention relates to stabilizing of a forest work unit and, in particular, to a method and arrangement for stabilizing at least one frame part of the forest work unit.

Various moving vehicles and machines frequently have to work on terrains which are uneven in different ways, as well as on inclined surfaces, whereby it is important to enable, one way or another, sufficient contact of the elements a vehicle or a machine moves on, such as its wheels and/or tracks, with the ground. It is usually desirable to maintain as good a contact with the ground or other working surface as possible for various reasons, such as the propulsion and tractive power of the vehicle, good roadholding between the surface and the vehicle, as low a surface pressure on the ground as possible, or good stability. Such properties are typically particularly emphasized in cross-country vehicles or machines, such as military vehicles or different forestry machines used for mechanical harvesting. These properties may be improved, e.g. by allowing shafts, axles or, particularly in cases of frame-steered machines, separate frames to rotate relative to one another. Different prior art arrangements relating to the rotation of frames of this type are, in fact, known for allowing the rotation and, on the other hand, for preventing or controlling it, when desired, by means of a hydraulically controlled tooth plate connector, friction brake or lock valves and hydraulic cylinders. One such solution is disclosed in publication WO 03055735.

It is thus known to arrange two separate frames of a forestry machine or another moving working machine together by both what is called a frame steering joint enabling steering of the working machine and a rotator joint enabling rotation of the frames relative to one another substantially in relation to the longitudinal axis of the vehicle. One such solution is known from publication EP1261515, for example.

A typical problem with prior art arrangements is that the rotation of frames relative to one another is prevented and allowed on the basis of status data obtained from the traction transmission. Hence, a typical mode of use is to prevent the rotation of the frames relative to one another when the machine is not being driven and, when the machine is being driven, the rotation of the frames is allowed. However, this restricts significantly an eventual use of a crane and its range of operation during drive, as the frame part comprising the crane is not supported in any way. On the other hand, the underlying assumption is that the boom assembly of the machine is only used when the machine is stationary, which significantly reduces productivity in harvester and forwarder operations, for example. Another typical problem with prior art solutions relates to bringing the vehicle to movement when frame rotation has been prevented using a high support moment. When the locking of the frame rotation is released, the frames seek a new position of balance and, when doing so, the frame or frames may swing even very sharply and strongly. Prior art solutions are also typically based on predetermined lockings or attenuation or prevention of rotation between frame parts, and hence they are not capable of reacting to changing circumstances.

A further problem associated with prior art shape-locked toothings and similar non-stepless frame lock implementations is that the lock often becomes locked to a position slightly different from that actually required by the terrain and the position of the machine's frame, which causes instability manifested by a hovering, for example, of the machine on the base. An attempt has been made to solve this problem by stepless locking solutions, such as brake solutions implemented by hydraulic cylinders and based on friction, to allow the locking to be made to a precisely desired rotation of the frames relative to one another. However, even these solutions are not able to take into account variation in the bearing capacity of the terrain under the machine, for example. In addition, strains caused to the ground surface during the works may lead to the surface pressure not being distributed evenly but the machine remains in an instable position, especially when it is stationary for a longer period of time during continued loading or work.

BRIEF DESCRIPTION

It is thus an objective of the invention to provide a method and an arrangement implementing the method so as to enable the above-mentioned problems to be solved. This objective is achieved by a method and arrangement characterized by what is stated in the independent claims. The preferred embodiments are disclosed in the dependent claims.

According to an aspect of the invention, a method for stabilizing at least one frame part of a forest work unit comprises the steps of determining a component of a moment applied by a payload of the forest work unit to the frame part to be supported, the component acting about an at least substantially longitudinal rotation axis, and determining at least on the basis of the moment applied to the frame part to be supported by said payload a magnitude and direction of at least one support moment needed at least for stabilizing the frame part.

According to a second aspect of the invention, an arrangement for stabilizing at least one frame part of a forest work unit comprises at least means for determining a component of a moment applied by a payload of the forest work unit to the frame part to be supported, the component acting about an at least substantially longitudinal rotation axis, and means for determining on the basis of the moment applied to the frame part to be supported by said payload a magnitude and direction of at least one support moment needed at least for stabilizing the frame part.

The idea of the solution is that the support moment needed for stabilizing a frame part is determined in a new manner, making use of the determined moment applied to the frame part to be supported by a payload.

An advantage of the method and arrangement is that it allows active adjustment of stabilization according to the working situation and prevailing circumstances. In addition, the solution allows devices used for controlling frame rotation to be used in a new manner for stabilizing the machine both when the machine is driven and when it is stationary.

According to a method of an embodiment, there is also determined a component of the moment applied to the frame part to be supported by the payload, the component acting about a transverse axis of the forest work unit.

According to a method of a second embodiment, a required support moment of a predetermined magnitude and direction is formed and adjusted.

According to a method of a third embodiment, said support moment is formed by at least one actuator that may be used for causing a predetermined moment in a desired direction and for locking said at least one actuator to its current position to prevent the frame parts from rotating relative to one another.

According to a method of a fourth embodiment, a position and/or state of movement of at least one supporting frame part and at least one frame part to be supported are determined in relation to an acceleration due to gravity vector, a magnitude and direction of at least one support moment needed at least for stabilizing the frame part are determined on the basis of at least said positions and/or states of motion and said component that acts about an at least substantially longitudinal rotation axis of a moment applied to the frame part to be supported by a payload.

According to a method of a fifth embodiment, a stability analysis of the frame parts is made, in addition, on the basis of said positions and/or states of motion and said moment, and an operating state of the forest work unit is selected among pre-determined alternatives on the basis of the results of the stability analysis. In some embodiments the alternatives for the operating state referred to may comprise at least one of the following operating states: active stabilization, locking of a position of frame parts relative to one another, immobilization, and alerting the user of an approaching extreme position and/or when an extreme position is reached.

According to some embodiments, the arrangement for stabilizing at least one frame part of a forest work unit may comprise means for implementing one or more of the above-mentioned method steps.

According to an embodiment, the means for generating and adjusting the required support moment comprise at least one actuator that may be used for applying a predetermined moment in at least one desired direction, the at least one actuator being lockable to its current position to prevent rotation of the frame parts relative to one another.

According to yet another embodiment, the means for determining a position and/or state of motion of at least one frame part to be supported in relation to an acceleration due to gravity vector comprise at least one sensor. In some embodiments, the sensor may be at least one of the following: acceleration sensor, inclinometer and angular velocity sensor.

According to yet another embodiment, the means for determining a component of a moment applied to the frame part to be supported by the payload of the forest work unit, the component acting about at least a rotation axis, comprise at least one of the following: measurement of an articulation angle of a pivoting of a boom assembly, measurement of a lift cylinder power and measurement of an articulation angle of a joint between the boom assembly base and the lift cylinder.

According to yet another embodiment, the means for determining a magnitude and direction of at least one support moment needed at least for stabilizing the frame part comprise at least a control unit.

According to yet another embodiment, the means for performing a stability analysis on the frame parts and for selecting an operating state of the forest work unit comprise at least a control unit.

According to yet another embodiment, the solution comprises a forest work unit that comprises an arrangement for stabilizing at least one frame part of the forest work unit.

BRIEF DESCRIPTION OF THE FIGURES

The invention is now described in closer detail in connection with preferred embodiments and with reference to the accompanying drawings, in which.

DETAILED DESCRIPTION

Figure 1A:
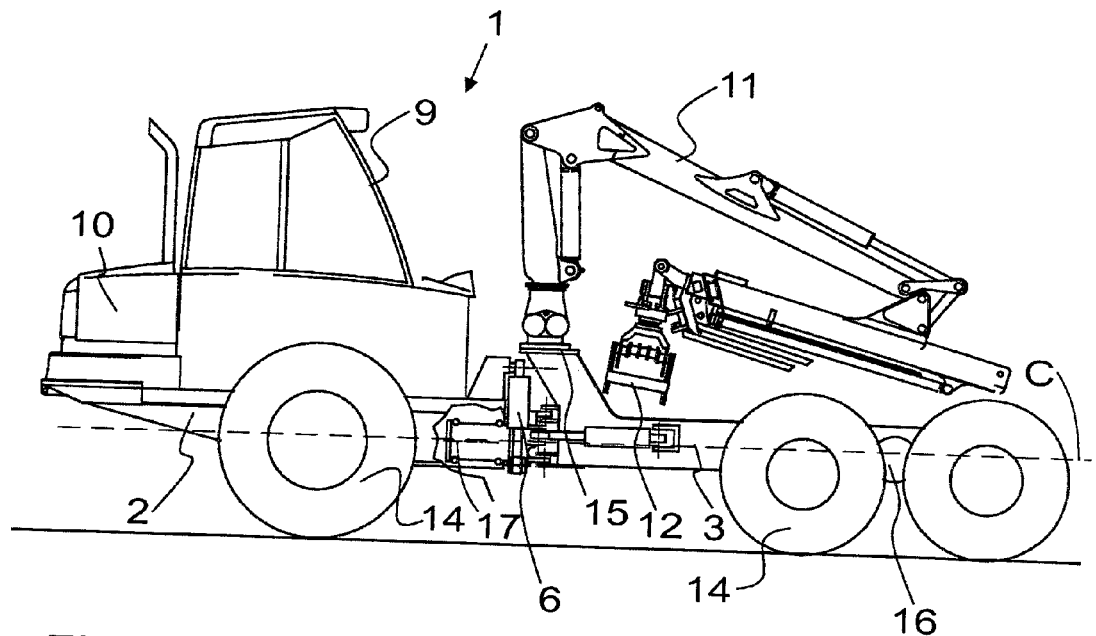
FIGS. 1a, 1b and 1c are schematic views of three examples of a forest work unit.

The disclosed method and arrangement are advantageous e.g. in connection with vehicles and machines, forestry work machines in particular, such as harvesters, loading tractors or combinations of these, comprising or handling payloads, and often moving on a ground, such as terrain, that is uneven and/or whose bearing capacity varies. A forest work unit of this type typically comprises at least two blocks or sections that are connectable to each other with connecting members or structures allowing at least rotation about the longitudinal axis of the vehicle or machine or about another rotation axis substantially parallel thereto. Instead of or in addition to this, the forest work unit may comprise an oscillating axle arranged rotatably in relation to the longitudinal axis of the machine, the oscillating axle structure forming one such section. According to some embodiments, an oscillating axle of this type may be a guiding axle, in which case the actual frame of the forest work unit may be rigid or at least one joint possibly joining its frame parts does not need to have any degrees of freedom, or the joint may be rigid at least in relation to rotation taking place about the longitudinal axis of the forest work unit. In other words, although in different embodiments the above blocks or sections may differ from one another even significantly as regards size, structure and mutual position, for the sake of simplicity these blocks or sections are all referred to as frame parts in the description of this solution.

Each frame part may, in each case, be for instance an actual separate frame part of the forest work machine or even a mere shaft, for example, arranged in each case to at least one other frame part substantially rotatably in relation to the longitudinal axis of rotation of the forest work unit, such as preferably an oscillating axle, for example a rocker tandem axle, a track system, an individual shaft or a similar shaft known per se, possibly provided with the required structural and/or fastening parts.

In the context of this solution the moment caused by the payload, i.e. the moment applied by the payload to one or more frame parts, refers to a moment caused by a physical item, such as a boom assembly and/or load, comprised or handled by a forest work unit and associated with the work of the forest work unit or a moment caused by the forest work unit or a part thereof, the moment acting at least momentarily on the stability of the forest work unit, tending to swing a frame to be supported usually at least substantially about a longitudinal rotation axis C of the forest work unit. The moment caused by the payload in question may thus be caused e.g. by a boom assembly diverted from the longitudinal direction of the forest work machine and/or a tool fitted to such boom assembly, such as a harvester or lifting head, or some other mass, such as timber to be handled, or a load of a forwarder, for example, or a payload comparable to these or an inertia of a mass of this type. The moment may also be caused by a feeding action of a tree trunk by a harvester head, for example, in which the pincher rolls of the harvester head often cause to the trunk a significant force acting in the longitudinal direction of the trunk. On the other hand, a significant moment may also be caused in a situation in which the harvester head is used for gripping firmly a tree trunk attached to the ground, such as a trunk fallen by storm. In different embodiments, the frame part or parts of the forest work machine may be subjected even to a plural number of moments caused by payloads, either simultaneously or, depending on the use or drive situation, e.g. by a plural number of booms, a boom and a load arranged to a cargo space or other similar sources. In different embodiments or situations, the moments caused by these payloads on one or more frame parts of the forest work unit may be of the same direction, of different directions and also opposite in direction, the moment caused by the payload referring in that case to the total moment caused by the moments of these partial payloads on each frame part of the forest work machine. When only a component of the moment applied to the frame part by the payload, which component acts about the rotation axis C, is being examined, there are naturally only two possible directions of moment. However, different embodiments may also take into account components of other directions in the moment caused by the payload, for example components acting about a transverse axis of the forest work unit.

The disclosed method and arrangement allow an active adjustment of stabilization according to a working situation and prevailing circumstances, for example adjusting the stabilization to changes in the total moment caused by unevenness of terrain or payload. In the context of the disclosed solution, stabilization means that the different frame parts of the machine would be as stable as possible during work and/or drive, i.e., that they would not tilt or lean significantly in relation to each particular position due to a moment caused by the payload or mass inertia, for example in relation to a position into which the machine sets at a particular time or into which it is set due to the terrain or its shapes. In other words, the aim is to minimize the effects of the total moment caused by the payload/s to the state of motion and position of the frame parts of the machine. At the same time, the aim is to distribute the moment caused by the payload as evenly as possible to as may support points as possible or to an area as wide as possible and/or at least to ensure that all support points are in contact with the ground or some other working platform. In other words, the strains directed to different frame parts are distributed more evenly than before. On the other hand, this allows also the surface pressure between the machine and the platform to be distributed more evenly. Hence stabilization in this context does not mean guiding one or more frame parts, for example, to a specific position relative to each other or the base, for example.

In this context, reference is made to what are known as one or more supporting frame parts or one or more frame parts to be supported. A frame part to be supported means a frame part to which the moment caused by the payload is primarily directed, i.e. usually the frame part to which a structure, such as a boom assembly, for example a crane, loader or other boom assembly, cargo space or the like, receiving the moment caused by the payload is arranged. A supporting frame part, i.e. a frame part providing support, means a frame part to which the load of the moment caused by the payload is distributed and/or transferred by means of stabilization, for example by generating a required support moment by means of at least one actuator. In different situations of drive and/or use different frame parts may be supporting frame parts and/or frame parts to be supported. In some cases, for example when the boom assembly is arranged to one frame part and the cargo space to another frame part, the supporting frame part and the frame part to be supported may vary according to the position of the frame parts and/or the boom assembly and, in certain cases, both frame parts may be subjected to a moment caused by the payload, in which case each frame part is, in a way, both a supporting frame part and a frame part to be supported.

In other words, stabilization may be used for distributing the moment caused by the payload as evenly as possible between different frame parts. If the forest work unit comprises at least one oscillating axle, which forms a frame part in the case in question, said oscillating axle may be used for the stabilization and thus the moment caused by the payload may be divided, depending on the embodiment, e.g. between the oscillating axle and a fixed axle arranged to the frame of the forest work unit or among a plural number of pendulum shafts forming one frame part.

The solution allows the boom assembly to be used efficiently also during drive. Providing efficient loading also when the machine is moving allows productivity to be improved even significantly particularly in forwarder operations, for example. In prior art solutions this has been possible only if the cargo space of the forwarder already contains enough loaded timber, in which case the total mass of what is known the rear frame, typically located below the cargo space, and the load has been sufficient to keep the frame underneath the forwarder erect. However, this has caused uneven stress on the frame structures and thereby a significant load particularly on an area between a foot and a rear bogie or rear axle of the forwarder. This stress phenomenon is particularly noticeable when a forwarder is loaded during drive. The present solution differs from the prior art in that the stress on the frame part to which the boom assembly is arranged can be significantly reduced by obtaining some of the support moment also from the supporting (front) frame, which allows precisely the load on the area between a base 15 of the boom assembly and the rear bogie or rear axle 16, for example, to be significantly reduced.

In addition, the solution now disclosed always allows for an at least as stable behaviour of the machine as a prior art fully locking frame lock. Moreover, it allows the machine to be moved even when the boom with a tool supported to an end thereof, such as a grab or a harvester head with the timber to be handled, are on a side of the machine. However, the solution now disclosed also enables load to be transferred and distributed fully freely in the frame structures of the machine. Consequently, strength qualities of the machine's frame structures and different operational situations can be taken into account quite flexibly.

Further still, the solution enables to detect in a controlled manner a situation in which a support moment provided by the supporting frame or the moment transfer ability of rotation control actuators no longer is sufficient for stabilizing the frame part to be supported. Depending on the embodiment, different functions, such as alerting the user and/or different control models, such as immobilization or mutual locking of the frames, may be applied in a situation such as this.

A further advantage of the solution now disclosed is that vibration, shocks or other motion are not unnecessarily transferred from the frame part to be supported to the supporting frame part or to a drive cabin mounted to the supporting frame and to the driver's work point. This is extremely important with regard to the driver's occupational health and ergonomics, and solutions of this type are needed in order to meet the requirements set by authorities on exposure to vibration, for example. On the other hand, for machines in which the control cabin is on the frame to be supported, the solution provides a control model efficiently stabilizing the frame to be supported as it allows the frame to be supported by a higher support moment than what is possible when a fully rigid frame lock is used.

Moreover, the solution now disclosed allows clear points of discontinuity in the loading paths/routes of the machine's frame structures to be avoided and the load to be thus distributed more evenly than before to the entire frame structure. In addition, load peaks and shocks caused by releasing and locking of a conventional frame lock can be avoided.

A still another clear advantage of the solution now disclosed is that, compared with prior art solutions, it allows the surface pressure between the machine and the terrain to be distributed better and more evenly on all the axles, wheel bogies or other elements of the machine, which in turn provides various advantages with regard to the durability of the machine and damages caused by terrain.

Figure 1B:
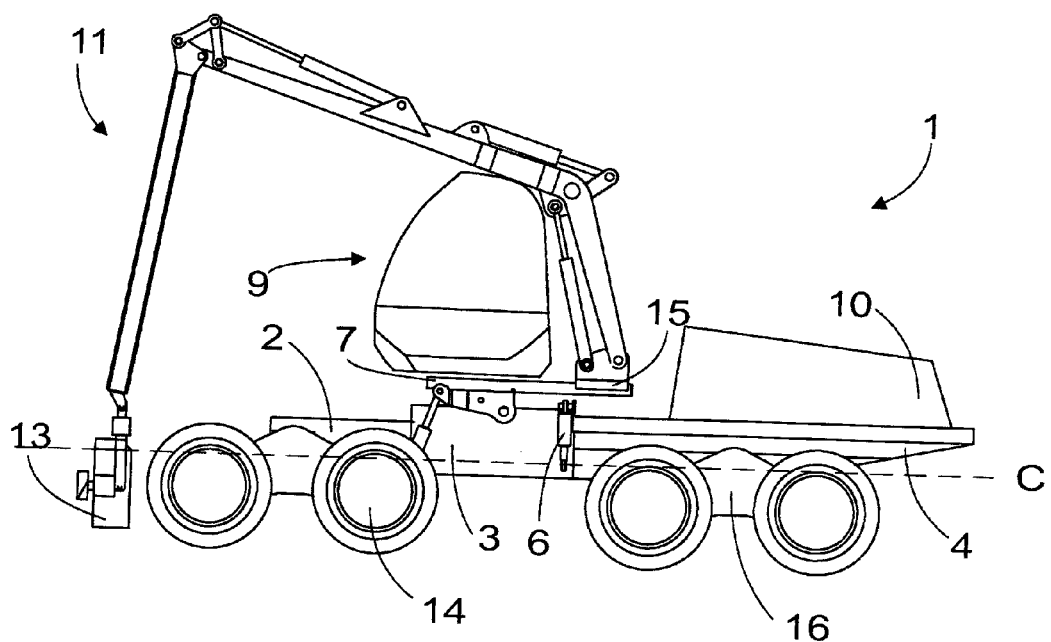
Figure 1C:
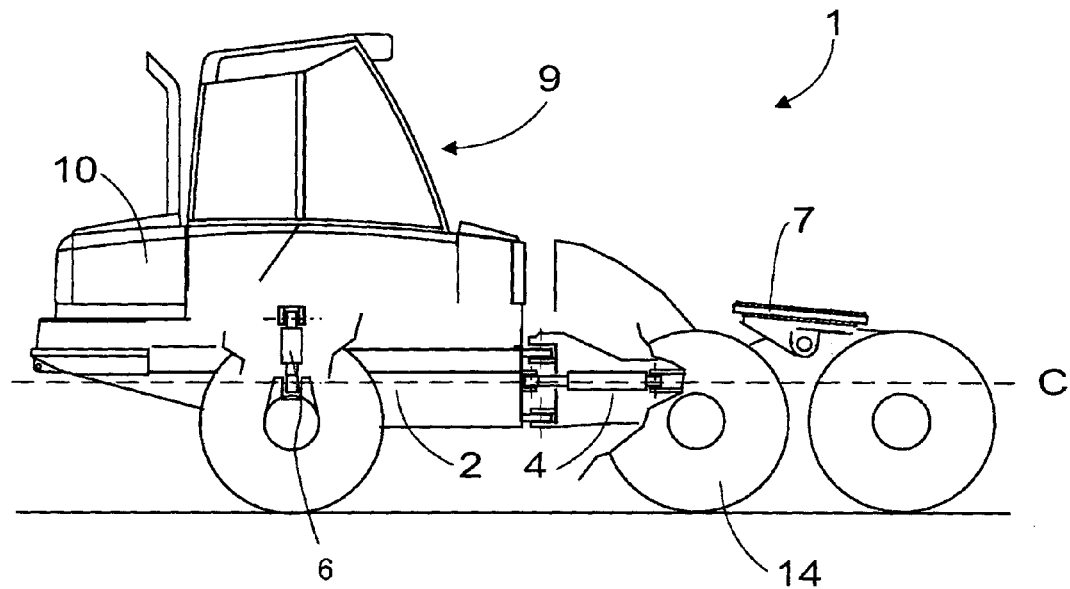

FIGS. 1a, 1b and 1c are schematic views showing examples of three forest work units 1. Parts of like structure and/or purpose are denoted with like reference numerals in the figures. A forest work unit 1, a forwarder in FIG. 1a and a harvester in FIG. 1 b, may comprise frame parts, in the case of FIG. 1a two frame parts 2, 3 joined together by articulation. The forest work unit 1 typically comprises a control cabin 9 arranged to one frame part 2, 3, 4, at least one power source 10 arranged to the same frame part 2, 3, 4 as the control cabin or to a different one for generating power to move and control the forest work unit and/or the tools therein. The forest work unit 1 further comprises tools, such as a boom assembly 11 and grab 12 attached thereto in FIG. 1a or a harvester head 13 attached thereto in FIG. 1 b, typically arranged to one or more frame parts 2, 3, 4. Moving forest work units 1 further comprise means for moving the forest work unit, e.g. wheels 14, block assemblies, foot mechanisms or other elements for movement known per se.

FIG. 1 c is a schematic view of a part of a forest work unit 1. According to the embodiment of the figure, the forest work unit 1 comprises a frame part 2 and a shaft rotatable relative to the frame part 2 about a longitudinal rotation axis C of the forest work unit. In addition, the forest work unit 1 of the figure comprises a second frame part 4 that is not rotatable relative to the frame part 2 about the longitudinal rotation axis C of the forest work unit but only in relation to a vertical axis E of the machine.

Figure 2A:
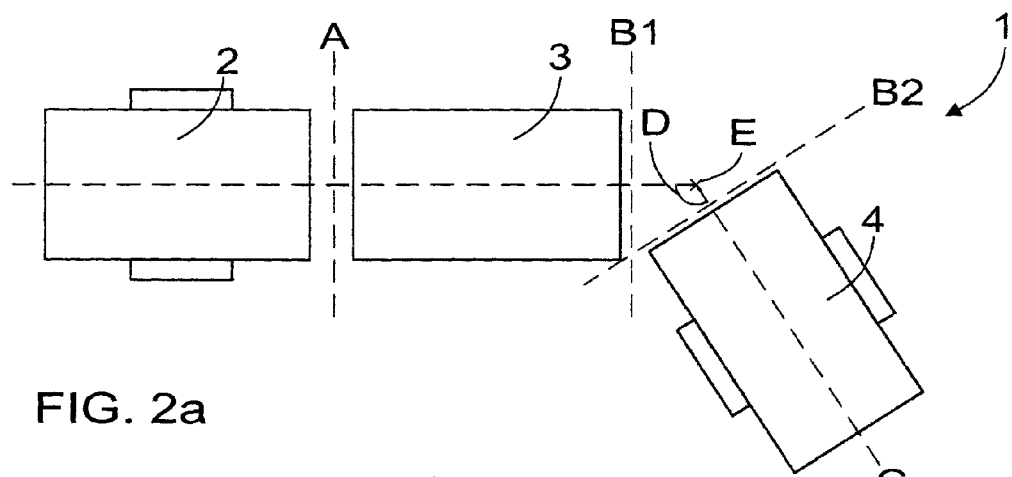
FIGS. 2a and 2b are schematic views of a forest work unit seen from different directions.
Figure 2B:
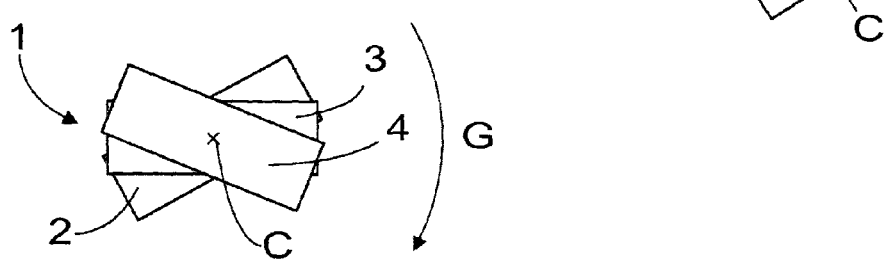

FIGS. 2a and 2b are schematic perspective views of a forest work unit 1 seen from above and from one end, respectively. The forest work unit 1 may comprise at least two, in FIGS. 2a and 2b three, sections or blocks, hereinafter referred to as frame parts 2, 3 and 4, of which at least two are rotatable relative to one another substantially about the longitudinal rotation axis C of the forest work unit. Hence, according to the different embodiments, the forest work unit 1 may also comprise two frame parts or more than three frame parts, for example four frame parts, and the frame parts may be substantially successive parts in the longitudinal direction of the actual frame of the forest work unit 1 or at least partly successive parts or oscillating axles, for example, as disclosed above. In the figures, all frame parts 2, 3 and 4 are shown as being of the same size although, as stated, in practice the frame parts 2, 3 and 4 may differ essentially from one another, with regard to both size and other properties and/or to how they are arranged in relation to one another.

In other words, at least two frame parts 2, 3, 4 of the forest work unit 1 may be rotatable relative to one another at least about one rotation axis C substantially parallel with the longitudinal axis of the forest work unit. According to an embodiment, the rotation axis C may be the longitudinal axis of the forest work unit 1 or an axis located close to it, preferably at a maximum distance of about 0.5 m, for example, and substantially parallel to it. According to the different embodiments, the two frame parts 2, 3, 4 of the forest work unit 1 may, in each case, be arranged substantially successively in the longitudinal direction of the forest work unit 1. According to yet some embodiments, the frame parts may be rotatable in blocks relative to one another and in relation to a substantially planar interface A, B perpendicular to the rotation axis C of the forest work unit 1. For the sake of simplicity, the interface A, B is depicted by broken lines A and B also in blocks 3 and 4 shown in perspective and thus in the solution of FIGS. 2a and 2b each frame part 2, 3 and 4 may form one block in each case.

Rotation taking place about the rotation axis C may, in each case, be implemented with any part or structure known per se that allows rotation of the frame parts 2, 3, relative to one another in said direction about the rotation axis C, for example with a rotator joint of at least one degree of freedom. Such solutions are known for example from publication EP1261515, and they may comprise, for example, an axle mounted on a bearing from at least one direction by means of bearing known per se, for example a ball bearing, another roller bearing, a slide bearing or another bearing that is strong enough.

In addition to the structural parts shown in the figures the forest work machine 1 may comprise a required number of parts known per se, including frame parts, devices, systems, components and other structural parts which are typical of vehicles and/or machines but not shown. Each of these structural parts may be, in each case, arranged in one or more frame parts 2, 3, 4 or in another structural part of the forest work machine 1.

In FIGS. 1a, 1b, 1c, 2a and 2b at least some of the frame parts 2, 3, 4 are provided with wheels 5, but in the different embodiments the forest work unit 1 may be provided with a suitable number of wheels, tracks, tandem shafts, track systems or other structural parts required for movement of the machine and known per se, and these may be arranged, in each case, in connection with one or more frame parts shown or not shown. In other words, one or more wheels, track systems, tandem shafts or the like may be arranged in various ways in any frame part 2, 3, 4, in any frame or structural part not shown, in several of these or their combinations. The forest work unit 1 may also comprise a frame part or frame parts formed without wheels, track systems, tandem shafts or the like.

FIG. 2a is a schematic view of a forest work unit 1 in a position of use. The forest work unit 1 of the figure is provided with a joint that joins together at least two frame parts, in this case frame parts 3 and 4, substantially successive in the longitudinal direction of the frame of the forest work unit 1, the joint allowing a pivoting about a substantially vertical axis of revolution E that is substantially perpendicular to rotation axis C of the forest work unit 1 to improve and/or enable steerability of the forest work unit 1. In the figure, the frame part 4 has thus pivoted, for example in connection with the steering of the forest work unit 1, relative to the frame part 3 about said substantially vertical pivot axis that is substantially perpendicular to the longitudinal rotation axis C of the forest work unit 1. The pivoting has an extent of an angle D, and the rotation axis C of the forest work unit 1 correspondingly forms a broken line having an angle of a corresponding extent between the frame parts 3 and 4. In various embodiments, there may be one or more such joints allowing pivoting about a vertical pivot axis, and they may be arranged, in each case, between two frame parts, shown or not shown, of the forest work unit 1. In that case, a number of angles corresponding to those of the joints is formed on the rotation axis C. In the different embodiments and operating situations, the frame parts 2, 3, 4 may move in relation to each other and the rotation axis C within the limits allowed by the clearances and plays of the frame parts and structures connecting them; for instance, they may rotate +/−40 degrees relative to each other, for example, or turn +/−45 degrees relative to each other, for example.

FIG. 2b is a schematic view of the three frame parts 2, 3, 4 seen from an end of frame part 4 of the forest work unit 1. In the position of use or movement of FIG. 2b the frame parts have rotated relative to one another so that the second frame part 3 is in a substantially horizontal position, i.e. a neutral position, frame part 2 has rotated counter-clockwise in the figure in relation to the second frame part 3, i.e. to a direction opposite to arrow G, and frame part 4 has rotated clockwise in the figure in relation to frame part 3, i.e. in the direction of arrow G.

Together with the stabilizing method and arrangement now disclosed, the frame shown in FIGS. 2a and 2b and formed of at least three frame parts 2, 3, 4 rotating relative to each other about the rotation axis C of the forest work unit 1 allows for many advantages compared with the prior art solutions. According to the different embodiments, a desired frame part, such as a frame part to be supported, for example, may be guided to a substantially horizontal position.

Figure 3:
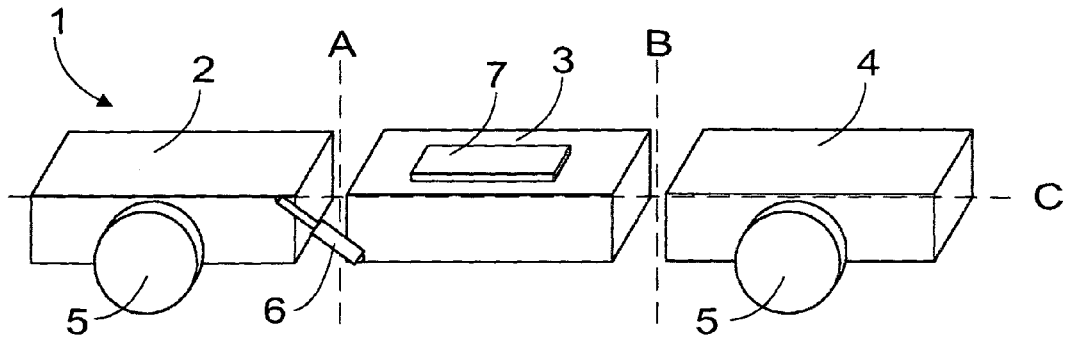
FIG. 3 is a schematic view of a forest work unit.

FIG. 3 shows a forest work unit 1 comprising a first rotation control actuator 6 for controlling the rotation between two frame parts 3, 4. The rotation control actuator 6 may preferably be any actuator used in vehicles and/or machines, for example a pressure-medium-operated actuator, such as a hydraulic cylinder, which can be controlled in a manner known per se, for instance hydraulically and/or electrically. In the different embodiments, a rotation control arrangement of another kind may be used in addition to and/or instead of the first rotation control actuator 6. One or more such first rotation control actuators 6 or arrangements may be provided, depending on the embodiment, per joint and one or more of said joints may be equipped with them.

Further, in the embodiment of FIG. 3, the forest work unit 1 comprises at least one mounting structure 7 which is, in each case, arranged in connection with at least one frame structure, preferably on the upper surface of the frame part or in the vicinity thereof. In the different embodiments, several mounting structures 7 may be provided. The mounting structure 7 may comprise one or more parts which may form a part of the frame part or be connected thereto. The mounting structure 7 may be further controlled to move about the rotation axis C or an axis substantially parallel with it, either separately or by controlling the frame part 2, 3, 4 to which the mounting structure 7 is arranged. The mounting structure 7 is thus preferably controllable to a substantially horizontal position in relation to a lateral pivoting of the forest work unit 1 taking place about the rotation axis C. The mounting structure 7 may preferably be provided e.g. with a cabin of the forest work unit 1, for which a position that is as stable and horizontal as possible in the direction of rotation taking place about the rotation axis C in particular but also in the direction of rotation substantially perpendicular to this and taking place around a transverse axis of the forest work unit 1 is preferable in view of occupational hygiene and occupational safety, and/or the boom system of a forestry machine, for which a position that is as horizontal as possible is preferable to maximize the utilization of the power available, for example. In the different embodiments, the cabin and/or crane or another boom system of a vehicle or machine 1, for example, may be arranged to be supported by substantially the same mounting structure 7. In still further embodiments, a primary power source of the forest work unit 1, such as a diesel engine, and other desired parts of power transmission may be preferably placed, if desired, to the mounting structure 7, which may be particularly advantageous in connection with particularly steep and/or inclined work environments and circumstances, for example. Accordingly, in some embodiments, the frame part 2, 3, 4 to which the mounting structure 7 is arranged may be a frame part to be supported. On the other hand, in other embodiments the frame part 2, 3, 4 to which the mounting structure 7 is arranged may be a supporting frame part, or the forest work unit 1 may comprise a plural number of mounting structures 7 arranged to a supporting frame part and/or a frame part to be supported. For example, according to an embodiment the supporting frame part may comprise a mounting structure 7 that may be provided with the cabin, for example, and the frame part to be supported may comprise a second mounting structure (not shown) to which e.g. a boom assembly, cargo space and/or another similar structure forming or receiving payload may have been arranged.

Figure 4:
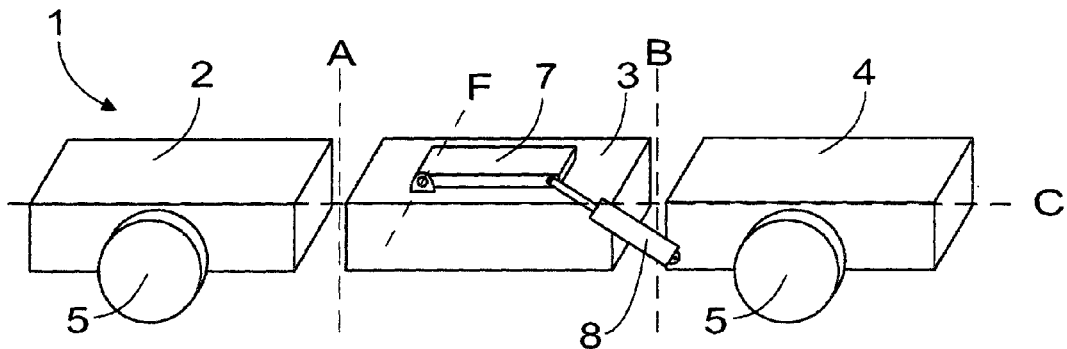
FIG. 4 is a schematic view of a second forest work unit.

FIG. 4 shows a solution in which the mounting structure 7 is provided with a second rotation control actuator 8 to guide the position of the mounting structure in relation to an inclination in the direction of the rotation axis C of the forest unit by a rotation directed about an axis F substantially perpendicular to the direction of the rotation axis C. The same second rotation control actuator 8 may in this kind of solution be also used for controlling rotation taking place in relation to rotation plane B. The actuator may be a pressure-medium-operated actuator, for example, such as a hydraulic cylinder, an electric actuator generating linear motion, or another actuator suitable for the purpose. In the different embodiments, one or more second rotation control actuators 8 per mounting structure 7 may be provided. In the different embodiments, the second rotation control actuator 8 may naturally be replaced with one or more systems of another kind allowing the mounting structure 7 to be rotated in relation to frame part 3 about the axis F and the rotation of frame parts 3, 4 about the rotation axis C to be controlled. In this kind of solution frame part 2, for example, may be a supporting frame part and frame parts 3 and 4 may be frame parts to be supported.

Figure 5:
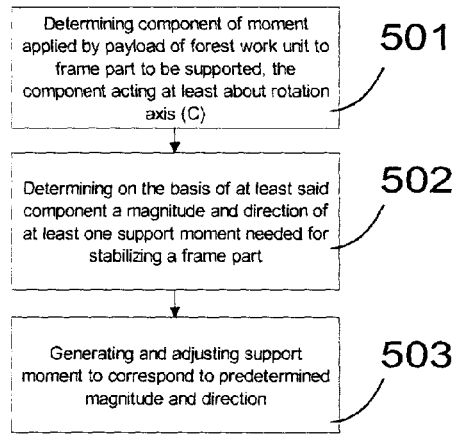
FIG. 5 is a schematic view of a method for stabilizing at least one frame part of a forest work unit.

FIG. 5 is a schematic view of a method for stabilizing at least one frame part 2, 3, 4 of the forest work unit 1. The method comprises determining 501 a component $T_{payloadX}$ which is a component of moment $T_{payload}$ applied to the frame part 2, 3, 4 by the payload of the forest work unit 1 and acts at least about the longitudinal axis of the machine. According to some embodiments, also components of the moment applied to the frame part to be supported by the payload that act in other directions, such as components acting about a transverse axis of the forest work unit or an axis substantially parallel to it and/or components acting about a substantially vertical axis, may be determined. In addition, the method of FIG. 5 comprises determining 502 at least on the basis of said component $T_{payloadX}$ a magnitude and direction of at least one support moment $T_{support}$ needed at least for stabilizing the frame part and adjusting 503 the support moment $T_{support}$ according to the determined magnitude and direction. In the different embodiments, the moment applied to at least one frame part to be supported by the payload $T_{payload}$ may be determined e.g. by some of the methods listed below and/or combinations thereof. The moment may be determined on the basis of direct moment measurement by a moment sensor and/or on the basis of direct or indirect measurement of forces and their moment arms and of vector calculation. Further, the moment may be determined by estimating it on the basis of e.g. modelling of the mechanics and/or dynamics of the forest work unit and/or the payload and/or a position and/or state of motion estimate of the control system of the forest work unit or some other model that allows a moment to be estimated. It is also possible to determine the moment as a combination of the above-listed measurements, data, computational values and/or methods, or by other similar means.

Typically the most preferred support moment $T_{support}$ is the smallest support moment that is sufficient for stabilizing a frame part to be supported and/or a frame of a forest work unit. On the other hand, as stated in a previous example, in machines with the control cabin on the frame to be supported, for example, a control model efficiently stabilizing the frame to be supported may be aimed at, the model allowing the frame to be supported by a higher support moment than what is possible when a rigid frame lock is being used. In that case the aim is not to have the smallest possible support moment but the most efficient stabilization possible of the frame part to be supported. Hence in the different embodiments the most preferred support moment may be, depending on the stabilization target and the situation of use, any moment between an as small a moment as possible and a support moment compensating for the moment applied to the frame to be supported by the payload. According to the different embodiments, the method may further comprise determining at least one position and/or state of motion of a frame part to be supported, for example. According to some embodiments, the method may comprise the determining of a position and/or state of motion of more than one frame part, e.g. at least one supporting frame part and at least one frame part to be supported.

According to some embodiments the required support moment $T_{support}$ is generated and adjusted to be of a predetermined magnitude and direction. The support moment may be generated by at least one actuator, for example, that may be used for causing a predetermined moment in at least one desired direction, the at least one actuator being lockable to its current position to prevent the frame parts from rotating relative to one another.

According to some embodiments, said one or more frame parts may also be subjected to a stability analysis on the basis of the moment applied to the frame part by said positions and/or states of motion and by said payload. This allows an operating state of the forest work unit to be selected, when desired, among predetermined alternatives on the basis of the stability analysis. According to some embodiments, the alternatives for the operating state may comprise at least one of the following operating states: active stabilization, locking of a mutual position of frame parts, immobilization, and alerting the user of an approaching extreme position and/or when an extreme position is reached.

Figure 6:
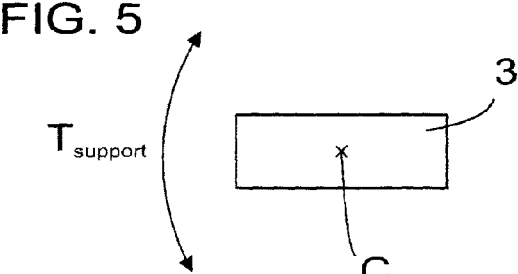
FIG. 6 is a schematic view of an example of a support moment of a frame part in a situation of FIG. 2b, for example.

FIG. 6 is a schematic view of an example of a support moment of a frame part, in this case the support moment of frame part 3, in a situation according to FIG. 2b, for example. The magnitude and direction of the support moment $T_{support}$ are preferably determined so that the support moment is at least equal to a first moment limit $T_{min}$, which is equal to a moment just enough to prevent the frame part 2, 3, 4 to be stabilized from falling to a side to which it would tend to fall or tilt without the support moment. In other words, the direction of the support moment $T_{support}$ is preferably determined according to which side the frame part 2, 3, 4 to be supported would tend to fall or tilt without the support moment. Hence the direction of the support moment $T_{support}$ is selected to be opposite to this moment that tends to fall the frame part 2, 3, 4, for example to be opposite to a moment caused to the side by gravity. However, the support moment must be smaller than a second moment limit $T_{max}$, which is at most equal to the one of the following that is smaller: a moment causing a frame part 2, 3, 4 to be supported to fall to the direction in which the support moment acts or a moment that causes a supporting frame 2, 3, 4 to lose its stability. FIG. 6 is an example showing a component of the support moment, the component acting about rotation axis C, but according to the different embodiments it is possible to determine and/or generate one or more support moments $T_{support}$ and the support moment may also have a different direction and/or comprise components acting in a plural number of directions.

In practice, it is often preferable to form an as small a support moment as possible, yet at the same time great enough to allow both frames to be kept stable. In that case the structures are not subjected to an unnecessary load, and both the supporting frame part and the frame part to be supported are stable. However, an optimal support moment may vary according to what is to be optimized, because when a strain acting on a specific frame part, for example the supporting frame part or the frame part to be supported, is being optimized, the optimal support moment may be greater.

According to the different embodiments, the support moment $T_{support}$ may be generated by at least one actuator. According to an embodiment, said support moment $T_{support}$ may be generated by at least one actuator that may be used for creating a predetermined moment in at least one desired direction. According to an embodiment, said support moment $T_{support}$ may be generated by at least two actuators each one of which may be used for creating a moment to at least one direction. According to another embodiment, said support moment $T_{support}$ may be generated by at least one actuator that may be used for creating a moment in at least two directions opposite to one another. Said actuators may thus be used for generating a total support moment having a magnitude and direction that correspond to the required support moment $T_{support}$. According to the different embodiments, said one or more actuators may be also locked to their current positions to prevent the frame parts from rotating relative to one another.

According to the different embodiments, the frame parts 2, 3, 4 may also be subjected to a stability analysis by applying the above-mentioned positions and/or motion states and the above-mentioned moment and the operational state of the forest work unit may be selected among predetermined alternatives on the basis of the result of the stability analysis. The stability analysis may also make use of the mechanical properties of the forest work unit and its frame parts that affect stability, such as a mechanical model of the forest work unit and/or its frame part or parts and/or their measurements. Depending on the embodiment, the stability analysis may be carried out taking into account, for the sake of simplicity, only the component of the moment that acts about the rotation axis C and/or at least a component of the moment that acts about a transverse axis of the forest work unit and/or components acting about a substantially vertical axis. According to the different embodiments, the alternatives for the operating state may comprise at least active stabilization and locking of a mutual position of the frame parts and/or alerting the user of an approaching extreme position and/or when an extreme position is reached. In this case, an extreme position refers to a limit value of stability in which the entire forest work unit starts to fall or is in immediate danger of falling. The extreme position may also be a position or situation in which the support moment needed for stabilizing the frame part to be supported is substantially equal to the highest support moment possible to be produced in the position and state of motion in question. According to yet some embodiments, the alternatives for the operating state may also comprise immobilization. Immobilization may be needed for example in a situation where it has been necessary to lock the rotation of the frame parts relative to one another to a specific position. Immobilization refers to an arrangement that allows the starting of the forest work unit to be prevented and/or, when necessary, a moving forest work unit to be stopped.

The method presented in the disclosure relating to FIG. 5 may be implemented by an arrangement in connection with a forest work unit having a frame that may be like the one described in the disclosure relating to FIGS. 1a to 4, for example. According to an embodiment, in that case said support moment may be generated by at least one actuator, which actuator or actuators may be used for creating a predetermined moment in at least one desired direction. According to the different embodiments, the actuator may also be locked to its current position to prevent the frame parts from rotating relative to one another.

According to some embodiments, the position and/or state of motion of one or more frame parts of the forest work unit 1, preferably at least one frame part to be supported, may be determined using in each case at least one sensor that may be an acceleration sensor or an inclinometer. In some embodiments, at least one angle velocity sensor may also be used, in addition to an acceleration sensor.

Figure 7:
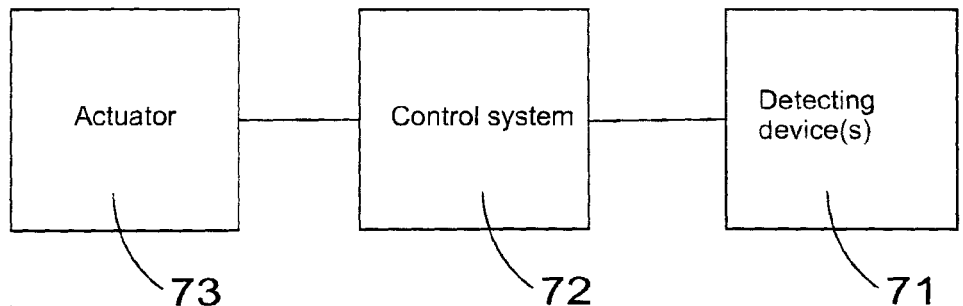
FIG. 7 is a schematic view of an arrangement for stabilizing at least one frame part of a forest work unit.

FIG. 7 is a schematic view of an arrangement for stabilizing at least one frame part 2, 3, 4 of the forest work unit 1. The arrangement comprises at least detection means 71 for detecting a moment caused by the payload or payloads, at least a component of at least this moment that acts at least about the rotation axis C. In addition, the arrangement comprises a control unit or system 72 for determining the magnitude and direction of at least one support moment needed at least for stabilizing one frame part 2, 3, 4 on the basis of at least a component of the moment caused by said payload. The arrangement further comprises at least one actuator 73 for forming and adjusting the support moment.

Figure 8:
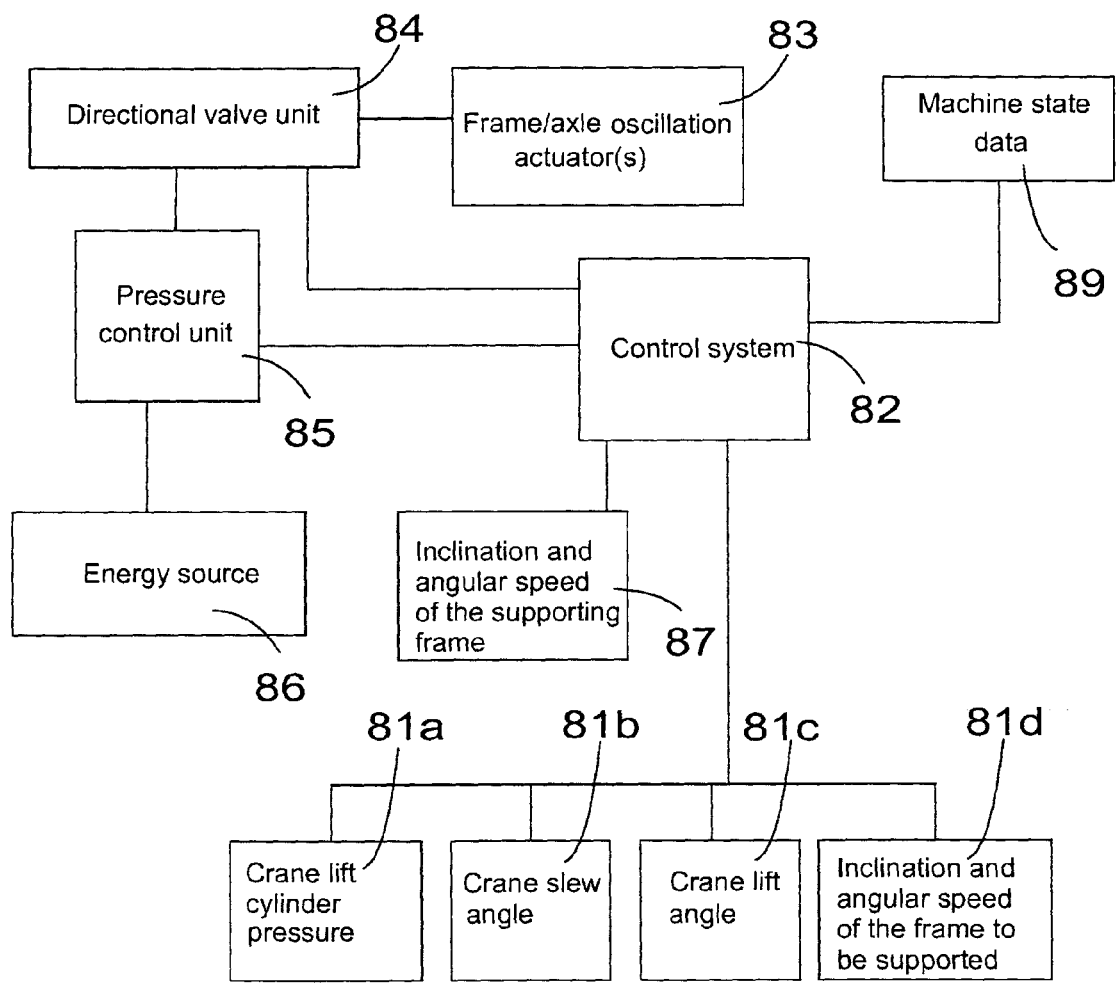
FIG. 8 is a schematic view of an embodiment for stabilizing at least one frame part of a forest work unit.

FIG. 8 is a schematic view of an embodiment for stabilizing at least one frame part 2, 3, 4 of a forest work unit 1, in which the rotation control arrangement comprises actuators 83, such as pressure-medium-operated actuators, e.g. hydraulic cylinders. In that case the pressure and direction control of the rotation control arrangement may be carried out by a control valve unit 84, such as a direction valve unit, controlling the direction of the moment and a pressure control unit 85 adjusting the magnitude of the moment by means of pressure. The pressure and direction control unit may comprise a plural number of separate components, for example a control valve unit 84 and a pressure adjustment unit 85, as shown in FIG. 8, or one integrated component. The control valve unit 84 may comprise a 4/3 direction valve, for example, with preferably a closed middle position, and the pressure adjustment unit 85 may comprise a pressure proportional valve having pressure feedback coupling and coupled to the direction valve, for example. In that case the closed middle position of the direction valve allows the cylinders to be locked, whereby also the output of the pressure valve closes, which allows the system pressure regulated by the pressure regulating valve to be lowered in order to save energy. The closed middle position may also be utilized e.g. in fault diagnostics of the pressure valve and a pressure sensor monitoring its operation, in which case the driver may be alerted in a fault situation of an operational disturbance and the stabilizing functionality may be prevented, when necessary. FIG. 8 also shows an energy source 86 for the arrangement.

In a support situation in which the rotation control arrangement is controlled on the basis of pressure, a frame joint 17 may rotate about the longitudinal axis, without the pressure changing hardly at all. Hence the support moment may be maintained also when driving on an uneven ground. If the ground fails under the wheels in a stationary state, the frames occupy a new position of balance without an extra load on the frame joint, which would appear with rigid rotation control. Since the real support moment follows the required moment in real time, the support moment changes evenly and no discontinuities appear, as would be the case with a conventional frame lock implementation.

The position and state of motion of the frame part 2, 3, 4 to be supported and/or the supporting frame part in relation to the acceleration due to gravity vector, and particularly to the direction thereof, may be determined for example by inclination and angular velocity sensing 81d, 87 of the frame part to be supported and/or the supporting frame part, carried out e.g. by a velocity sensor, inclinometer and/or angular velocity sensor, and, on the basis of this, the effect of the position of the frame parts on the support moment may be determined in a control unit or system 72, 82. The payload may consist of a movable boom assembly of the forest work unit and/or a load to be lifted with it. The moment caused by such boom operations may be estimated fairly accurately on the basis of a pressure 81a of the lift cylinder of the boom assembly and position data 81b, 81c of the boom assembly and a base 15 of the boom assembly, for example. Another way of calculating the moment caused by the boom assembly and/or some other payload, if any, such as a load, is to calculate it on the basis of the cylinder pressures (4-point measurement) and position of a base to be tilted in two directions or by separate power sensing of the base, for example by means of pin sensors and/or strain gauges.

However, the support moment is preferably not increased to exceed the second moment limit $T_{max}$. If the moment is increased too much, the supporting frame will eventually fall. If the driver is sitting on the frame to be supported, s/he is not necessarily capable of detecting that the supporting frame is about to fall. For this reason an actively regulated support moment is restricted to a safe value.

Also the operational state 89 of the forest work unit may be taken into account in the stabilization method and arrangement. In addition to or instead of this, the frame parts may also be subjected to a stability analysis, when necessary, on the basis of the above-mentioned positions and/or motion states and the moment caused to the frame by the payload, and a new operating state for the forest work unit may be selected, when necessary, among predetermined alternatives on the basis of the result of the stability analysis. Possible operating states of this kind have been discussed above with reference to FIG. 6, for example.

If the determined support moment exceeds the second moment limit $T_{max}$ when the forest work unit is stationary, the rotation of the frame may be controlled by controlling the frame joint to be stiffened in a conventional manner by lock valves, for example, the entire mass of the forest unit thus participating fully to the stabilization of the machine. This improves the stability and safety of the forest work unit significantly, because in that case the driver notices the instability by the tilting of the entire forest work unit, the forest work unit behaving logically on a rigid frame joint. In that case rotation may be kept locked until the required support moment has dropped slightly below the second moment limit $T_{max}$. When the rotation is again released, the actuators for rotation control may return to active stabilization.

For situations, in which the required support moment exceeds the second moment limit $T_{max}$ during drive, a threshold value on the level of the predetermined support moment may be determined for the pressure of the cylinders of the frame lock because it is not appropriate to lock the rotation of the frame during drive, nor can the support moment be increased in order to ensure the stability of the supporting frame part. However, the behaviour of the forest work unit is logical and a result of the driver's own actions, the driver thus being able to prevent loss of stability and the supporting frame part from falling. Moreover, in the disclosed solutions the moment needed for falling the supporting frame is significantly higher than when conventional so-called frame locks are used. A corresponding functionality can naturally be implemented also by an actuator of some other type, for example by electric actuators.

In the above cases, in which the required support moment approaches the second moment limit $T_{max}$ or reaches or exceeds it, the control system may be arranged to detect an instability in the frame parts. This makes it possible to warn the driver of an imminent, possibly dangerous situation by audiovisual means, for example. In addition, according to the different embodiments, the driving of a forest work unit may be determined to be prevented during the drive, or the forest work unit may be forced to stop if the required support moment approaches the second moment limit $T_{max}$. In addition, in the different embodiments starting may be determined to be prevented if an attempt is made to make the forest work unit move when the required support moment is equal to or higher than the second moment limit $T_{max}$. In that case driving may be allowed only after the driver has moved the boom assembly closer to the longitudinal axis of the forest work unit, for example.

The disclosed stabilization method and arrangement may also be used in other forest work units, such as forwarders, if the moment caused by the load can be measured by cargo space scales, for example. In addition, the method and arrangement disclosed above may naturally be used also in other corresponding work machines working on an uneven ground and comprising at least two frame parts that may be rotated relative to one another.

In the figures, the frame parts 2, 3, 4 are shown, for the sake of simplicity, separate from each other and structural parts connecting them are mainly not shown in the figures. Naturally, successive structural parts may, in each case, be connected to each other by any structural parts or structures allowing the features of the independent claims.

The disclosed actuators of the different embodiments, such as the first rotation control actuator 6 and/or the second rotation control actuator 8, may be replaced by an articulation actuator, for example, such as a wing actuator, or some other torque motor, or the like, producing a restricted movement or by another similar solution known per se and suitable for the purpose.

It will be apparent to a person skilled in the art that as technology advances, the basic idea of the invention may be implemented in many different ways. The invention and its embodiments are thus not restricted to the examples described above but may vary within the scope of the claims.

The invention claimed is:

1. A method for stabilizing at least one frame part of a forest work unit having a plurality of frame parts, wherein the method comprises the steps of:
    determining a first component of a moment applied to the at least one frame part of the forest work unit by a payload carried by the at least one frame part to be supported of the forest work unit, the first component acting about a longitudinal rotation axis of the forest work unit;
    determining on the basis of at least the first component of the moment applied by the payload to the at least one frame part to be supported a magnitude and direction of at least one support moment required for stabilizing the at least one frame part;
    generating and adjusting the required support moment to a magnitude and direction with at least one actuator to stabilize the at least one frame part; and
    applying the required support moment to the at least one frame part.

2. The method as claimed in claim 1, wherein the method further comprises the step of determining a second component of the moment applied by the payload to the at least one frame part to be supported, the second component acting about a transverse axis of the forest work unit.

3. The method as claimed in claim 1, wherein the at least one actuator is arrangeable to apply a predetermined moment in a desired direction and to lock said at least one actuator to its current position to prevent the frame parts from rotating relative to one another.

4. The method as claimed in claim 1, wherein the method further comprises the steps of:
    determining a position or a motion state of at least one supporting frame part of the forest work unit and the at least one frame part to be supported in relation to an acceleration due to gravity vector; and
    determining a magnitude and direction of at least one support moment needed at least for stabilizing the at least one frame part on the basis of at least said positions or states of motion and the first component of the moment applied by the payload to the at least one frame part to be supported, the first component acting about the longitudinal rotation axis.

5. The method as claimed in claim 4, wherein the method further comprises the step of making a stability analysis of the frame parts on the basis of said positions or states of motion and said moment, and selecting on the basis of the stability analysis an operating state for the forest work unit among predetermined alternatives.

6. The method as claimed in claim 5, wherein the alternatives for the operating state comprise at least active stabilization and locking of a position of the frame parts relative to one another.

7. The method as claimed in claim 5, wherein the alternatives for the operating state further comprise immobilization.

8. The method as claimed in claim 5, wherein the alternatives for the operating state comprise at least alerting the driver when an extreme position is being approached or when an extreme position is reached.

9. An arrangement for stabilizing at least one frame part of a forest work unit having a plurality of frame parts, wherein the arrangement comprises:
a control system, the control system configured to:
determine a component of a moment applied to the at least one frame part of the forest work unit by a payload carried by the at least one frame part to be supported of the forest work unit, the component acting about a longitudinal rotation axis of the forest work unit; and
determine on the basis of at least the moment applied by the payload to the at least one frame part to be supported a magnitude and direction of at least one support moment required for stabilizing the at least one frame part; and
at least one actuator connected to the at least one frame part, the at least one actuator generating the required support moment to a magnitude and direction to stabilize the at least one frame part.

10. The arrangement as claimed in claim 9, wherein the at least one actuator adjusts the required support moment to a magnitude and direction based on the component of the moment applied to the at least one frame part of the forest work unit by the payload.

11. The arrangement as claimed in claim 10, wherein the at least one actuator is configured to cause a predetermined moment in at least one desired direction, the at least one actuator being lockable to its current position to prevent rotation of the frame parts relative to one another.

12. The arrangement as claimed in claim 9, wherein the control system is further configured to: determine a position of the at least one frame part to be supported or a state of motion in relation to an acceleration due to gravity vector; and
determine on the basis of the component of the moment applied by the payload to the frame part to be supported, the component acting about the longitudinal rotation axis, the magnitude and direction of the at least one support moment needed for stabilizing the at least frame part.

13. The arrangement as claimed in claim 12, wherein the control system is further configured to make a stability analysis of the frame parts on the basis of the positions or motion states and said moment and select on the basis of the result of the stability analysis an operating state for the forest work unit among the predetermined alternatives.

14. The arrangement as claimed in claim 13, wherein the alternatives for the operating state comprise at least active stabilization and locking of a mutual position of the frame parts.

15. The arrangement as claimed in claim 13, wherein the alternatives for the operating state further comprise immobilization.

16. The arrangement as claimed in claim 13, wherein the alternatives for the operating state comprise at least alerting the driver when an extreme position is being approached or when an extreme position is reached.

17. The arrangement as claimed in claim 12, further comprising a sensor to determine the position of at least one frame part to be supported or a state of motion in relation to an acceleration due to gravity vector.

18. The arrangement as claimed in claim 17, wherein the sensor is an acceleration sensor or an inclinometer.

19. The arrangement as claimed in claim 17, wherein the sensor is an angular velocity sensor.

20. The arrangement as claimed in claim 9, wherein the control system determines the component of the moment applied by the payload to the frame part to be supported of the forest work unit, the component acting about at least the rotation axis, by using at least one of the following: measurement of the articulation angle of the pivoting of the boom assembly, and measurement of the lift cylinder power and measurement of the articulation angle of the joint between the boom assembly base and the lift cylinder.

21. An arrangement for stabilizing at least one frame part of a forest work unit having a plurality of frame parts, wherein at least two frame parts are rotatable relative to one another substantially about the longitudinal rotation axis of the forest work unit, the arrangement comprising:
a control system, the control system configured to:
determine a component of a moment applied to the at least one frame part of the forest work unit by a payload carried by the at least one frame part to be supported of the forest work unit, the component acting about an at least substantially longitudinal rotation axis of the forest work unit; and
determine on the basis of at least the moment applied by the payload to the at least one frame part to be supported a magnitude and direction of at least one support moment required for stabilizing the at least one frame part; and
at least one actuator connected to the at least one frame part, the at least one actuator generating the required support moment to a magnitude and direction to stabilize the at least one frame part,
wherein said at least two frame parts comprise a first frame part comprising said frame part to be supported to which the moment caused by the payload is primarily directed, and a second frame part comprising a supporting frame part to which the load of the moment caused by the payload is distributed and/or transferred to by means of stabilization by generating the required support moment by means of the at least one actuator.

* * * * *